United States Patent [19]

Ishiwata et al.

[11] Patent Number: 5,332,909

[45] Date of Patent: Jul. 26, 1994

[54] RADIATION IMAGE CONVERTING APPARATUS

[75] Inventors: Kenji Ishiwata; Siro Takeda; Fumihiro Namiki; Takahiro Haraki; Hideyuki Hirano, all of Kawasaki, Japan

[73] Assignee: Fujitsu Limited, Kawasaki, Japan

[21] Appl. No.: 115,671

[22] Filed: Sep. 2, 1993

Related U.S. Application Data

[63] Continuation of Ser. No. 904,655, Jun. 26, 1992, abandoned.

[30] Foreign Application Priority Data

Jul. 2, 1991 [JP] Japan .................................. 3-161915

[51] Int. Cl.5 .............................................. G03B 42/02
[52] U.S. Cl. ..................................... 250/584; 378/186
[58] Field of Search ................. 250/327.2 A, 327.2 B, 250/327.2 D, 484.1 B, 487.1; 378/185, 186

[56] References Cited

U.S. PATENT DOCUMENTS 3,735,130  5/1973  Bock et al. ........................ 250/66
3,859,527  1/1975  Luckey ............................. 250/327
4,158,143  6/1979  Göhrich et al. ................... 378/152

FOREIGN PATENT DOCUMENTS 0142706  5/1985  European Pat. Off. ............ 378/186

Primary Examiner—Paul M. Dzierzynski
Assistant Examiner—Richard Hanig
Attorney, Agent, or Firm—Staas & Halsey

[57] ABSTRACT

The invention relates to a radiation image converting apparatus which employs an accelerated phosphorescence fluorescent plate which is rigid or low in flexibility, and it is an object of the invention to provide a radiation image converting apparatus which prevents radiations having passed through an accelerated phosphorescence fluorescent plate from being scattered and irradiated upon the accelerated phosphorescence fluorescent plate again and achieves miniaturization of the equipment and simplification in structure. The radiation image converting apparatus of the present invention is comprises a lead containing sheet or a radiation absorbing plate which is composed of a plurality of rigid lead containing plates combined with each other, and a moving mechanism for moving the lead containing sheet or the radiation absorbing plate such that the lead containing sheet or the radiation absorbing plate is moved to a position behind the accelerated phosphorescence fluorescent plate prior to photographing but is retracted from the position behind the accelerated phosphorescence fluorescent plate prior to reading.

6 Claims, 7 Drawing Sheets

RADIATION IMAGE CONVERTING APPARATUS

This application is a continuation of Ser. No. 07/904,655 filed Jun. 26, 1992 now abandoned.

BACKGROUND OF THE INVENTION

1. Field of the Invention

This invention relates to a radiation image converting apparatus which employs an accelerated phosphorescence fluorescent screen having a certain rigidity or a low flexibility and more particularly, to a radiation image converting apparatus which has a structure which decreases diffused radiation upon photographing.

2. Description of the Related Art

In recent years, systems wherein a radiation image is recorded on an X-ray film or the like and the film on which a radiation image is recorded is used for observation, diagnosis, etc., have been and are gradually being replaced by another type of system wherein radiation having passed through an object for photographing are irradiated upon an accelerated phosphorescence fluorescent material formed in a sheet or a panel to accumulate and record a radiation image on the accelerated phosphorescence fluorescent material and then the radiation image is photoelectrically read to obtain an image signal, for which suitable image processing is subsequently performed to obtain a reproduction image. Basic construction of a system which employs an accelerated phosphorescence fluorescent material is disclosed in detail in U.S. Pat. No. 3,859,527. Here, the accelerated phosphorescence fluorescent material signifies a fluorescent material which accumulates energy. When radiation such as X-rays, $\alpha$ rays, $\beta$ rays or $\gamma$ rays are irradiated thereupon, and if excitation light such as infrared rays, visible rays or ultraviolet rays is irradiated thereupon within a given period of time, then the accumulated energy is radiated as accelerated phosphorescence light. A kind of radiation energy of which it is easy to accumulate, a wavelength of excitation light with which accelerated phosphorescence light is liable to be radiated, a wavelength of accelerated phosphorescence light to be emitted and so forth are different depending upon different kinds of fluorescent materials.

It is recognized, with a system which employs an accelerated phosphorescence fluorescent material, that the amount of accelerated phosphorescence light emitted from the accelerated phosphorescence fluorescent material by irradiation of excitation light increases in proportion, over a wide range of energy, to the energy of the radiation irradiated upon the accelerated phosphorescence fluorescent material. Further, the ratio between the amount of light and the energy can be varied by an amount of excitation light. Accordingly, a radiation image which is not influenced by a variation in the amount of exposure radiation can be obtained. Further, in a system for obtaining an X-ray image of a human body, the exposure dose to a human body upon X-ray photographing can be reduced.

A radiation image converting apparatus may include a photographing and recording section, including an accelerated phosphorescence fluorescent plate, wherein an accelerated phosphorescence fluorescent material is formed in a panel and is rigid or has limited flexibility, and a reading unit for irradiating excitation light upon the accelerated phosphorescence fluorescent plate which has a radiation image accumulated and recorded thereon, the reading unit receiving accelerated phosphorescence light radiated from the accelerated phosphorescence fluorescent plate to obtain an image signal. The radiation image converting apparatus has a problem such that, when radiation such as X-rays are irradiated upon the accelerated phosphorescence fluorescent plate, part of the irradiated radiation passes through the accelerated phosphorescence fluorescent plate and are scattered in the inside of the apparatus so that they impact upon the accelerated phosphorescence fluorescent plate again, and consequently, the sharpness of a radiation image accumulated and recorded on the accelerated phosphorescence fluorescent plate is deteriorated, so that a visible image reproduced in accordance with an image signal obtained by reading the radiation image is made unclear.

One of the possible solutions to the problem may be to provide, similarly as in a conventional apparatus which employs an X-ray film, a rigid lead plate on the rear face side of the accelerated phosphorescence fluorescent plate such that radiations having passed through the accelerated phosphorescence fluorescent plate may be absorbed by the lead plate, so that they may not be admitted into the inside of the apparatus. In the case of a conventional apparatus which employs an X-ray film, there is no problem if a lead plate is disposed in such a manner as described just above because an X-ray film after completion of photographing is taken out to effect development thereof. However, when an accelerated phosphorescence fluorescent plate is employed, it is necessary to dispose, after completion of photographing, the accelerated phosphorescence fluorescent plate and the reading unit close to each other to effect reading of a radiation image accumulated and recorded on the accelerated phosphorescence fluorescent plate. Therefore, if a lead plate is disposed on the rear face side of the accelerated phosphorescence fluorescent plate, then it is difficult to place, when reading is to be performed, the accelerated phosphorescence fluorescent plate and the reading unit close to each other, which is a serious obstacle to miniaturization of the apparatus and simplification in structure of the apparatus.

Further, while the object is fundamentally different from that of the present invention, a technique that, in an apparatus which includes a combination of a so-called film screen method wherein an X-ray image is photographed and recorded on an X-ray film combined with an intensifying screen and another so-called fluoroscopic photographing method wherein X-rays are converted into an electric signal using an X-ray fluoroscopic intensifying tube and then the X-ray image is observed on a CRT display, a thin lead plate is adhered to the intensifying screen and the intensifying screen is moved to and from a location in front of the X-ray fluoroscopic intensifying tube, is already known and disclosed in Japanese Patent Laid-Open Application No. 2-100042.

SUMMARY OF THE INVENTION

It is an object of the present invention to provide a radiation image converting apparatus which prevents radiation having passed through an accelerated phosphorescence fluorescent plate from being scattered and irradiated upon the accelerated phosphorescence fluorescent plate again and achieves miniaturization of the equipment and simplification in structure.

In order to attain the object according to the present invention, there is provided a radiation image converting apparatus which comprises a photographing and recording section including an accelerated phosphorescence fluorescent plate on which a radiation image is to be accumulated and recorded, and a reading unit for irradiating excitation light upon the accelerated phosphorescence fluorescent plate on which a radiation image is accumulated and recorded, and for receiving accelerated phosphorescence light emitted from the accelerated phosphorescence fluorescent plate to obtain an image signal carrying the radiation image, the radiation image converting apparatus comprising a flexible lead containing sheet for absorbing radiation and a moving mechanism for moving the lead containing sheet.

Here, prior to photographing the lead containing sheet is moved by the sheet moving mechanism to a position behind the accelerated phosphorescence fluorescent plate, wherein a radiation image is accumulated and recorded onto the accelerated phosphorescence fluorescent plate during photography prior to reading, wherein, during reading the radiation image is read to obtain an image signal, the lead containing sheet is moved away from the position behind the accelerated phosphorescence fluorescent plate.

It is to be noted that the moving mechanism may be constructed such that it can move the lead containing sheet to the position behind the accelerated phosphorescence fluorescent plate and another position retracted from the position and the moving mechanism and in other ways, and is not limited to the concrete moving system thereof. For example, the moving mechanism may be constructed such that it winds the accelerated phosphorescence fluorescent plate thereon or may be constructed otherwise such that it moves the accelerated phosphorescence fluorescent plate, without winding it, to any other position at which the accelerated phosphorescence fluorescent plate does not create an obstacle.

Further, in the present invention, the positional relationship between the accelerated phosphorescence fluorescent plate and the reading unit is not limited to a particular one, for example, the reading unit is disposed behind the lead containing sheet such that it irradiates excitation light upon the accelerated phosphorescence fluorescent plate from the rear face side and reads accelerated phosphorescence light emitted from the rear face side of the accelerated phosphorescence fluorescent plate.

It is to be noted that the lead containing sheet may be replaced by a radiation absorbing plate composed of a plurality of lead containing plates combined in such a manner as to have a flexibility at least in a predetermined direction. In this instance, a first moving mechanism is constructed such that it moves the radiation absorbing plate between the position behind the accelerated phosphorescence fluorescent plate and the position retracted from the position.

Since the radiation image converting apparatus of the present invention is constructed such that it comprises the flexible lead containing sheet or the flexible radiation absorbing plate (such lead containing sheet or radiation absorbing plate may be hereinafter referred to as "lead containing sheet" as a representative of both) and the moving mechanism for moving the lead containing sheet from and to the position behind the accelerated phosphorescence fluorescent plate and that the lead containing sheet is disposed, upon photographing, behind the accelerated phosphorescence fluorescent plate, radiation having passed through the accelerated phosphorescence fluorescent plate is absorbed by the lead containing sheet, and consequently, scattered radiation is prevented from being admitted into the accelerated phosphorescence fluorescent plate to deteriorate the sharpness of a radiation image. Further, since the lead containing sheet is retracted prior to reading, the accelerated phosphorescence fluorescent plate and the reading unit can be readily disposed close to each other, and accordingly, the lead containing sheet will not create an obstacle to reading. Since the flexible lead containing sheet is moved in this manner, a mechanism for moving the lead plate (lead containing sheet) is simplified in comparison with another mechanism having an arrangement wherein a rigid lead plate is employed in a conventional system for recording an X-ray image onto an X-ray film or a conventional system employing an accelerated phosphorescence fluorescent plate. Thus, miniaturization of the equipment and simplification in structure can be realized.

Here, since the lead containing sheet has flexibility, it may be wound up and retracted from the position behind the accelerated phosphorescence fluorescent plate. In case such a construction is employed, only a small space is required in which the lead containing sheet is to be retracted, and accordingly, equipment which is further reduced in size can be constructed.

Further, when the reading unit is provided on the rear face side of the accelerated phosphorescence fluorescent plate such that reading is performed from the rear face side of the accelerated phosphorescence fluorescent plate, reading can be performed while the accelerated phosphorescence fluorescent plate is kept fixed or makes a simple parallel movement or the like, which contributes to further simplification of the mechanism and further reduction in the size of the equipment.

DESCRIPTION OF THE PREFERRED EMBODIMENTS

Figure 1:
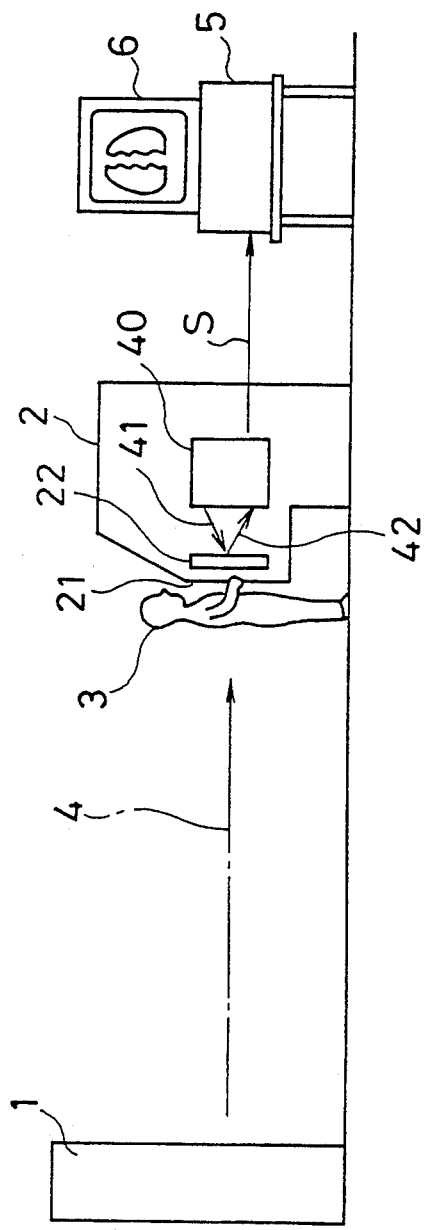
FIG. 1 is a schematic illustration showing a system for obtaining an X-ray image of a human body.

Referring first to FIG. 1, an entire system for obtaining an X-ray image of a human body is shown including an X-ray image converting apparatus to which the present invention is applied.

An object 3 to be photographed will be disposed in front of a photographing and recording section 21 of an X-ray image converting apparatus 2 between an X-ray generating apparatus 1 and the X-ray image converting apparatus 2. In this condition, X-rays 4 are emitted from the X-ray generating apparatus 1, and those of the X-rays 4, which have passed through the object 3 for photographing are irradiated upon an accelerated phosphorescence fluorescent plate 22 provided in the photographing and recording section 21, so that an X-ray image of the object 3 to be photographed is accumulated and recorded on the accelerated phosphorescence fluorescent plate 22.

A reading unit 40 is provided in the X-ray image converting apparatus 2. After photographing occurs, the accelerated phosphorescence fluorescent plate 22 is scanned by a laser beam 41 which serves as excitation light, whereupon accelerated phosphorescence light emitted from each scanning point is photoelectrically read in the reading unit 40 and A/D (analog to digital) converted, so that a digital image signal S is produced. The image signal S is input to an image processing apparatus 5, in which various image processes such as a frequency emphasizing process are performed for the image signal S, whereafter the image signal S is input to an image display unit 6 such as a CRT image display unit, so that a visible image based on the image signal is reproduced and displayed on the image display unit 6.

Figure 2:
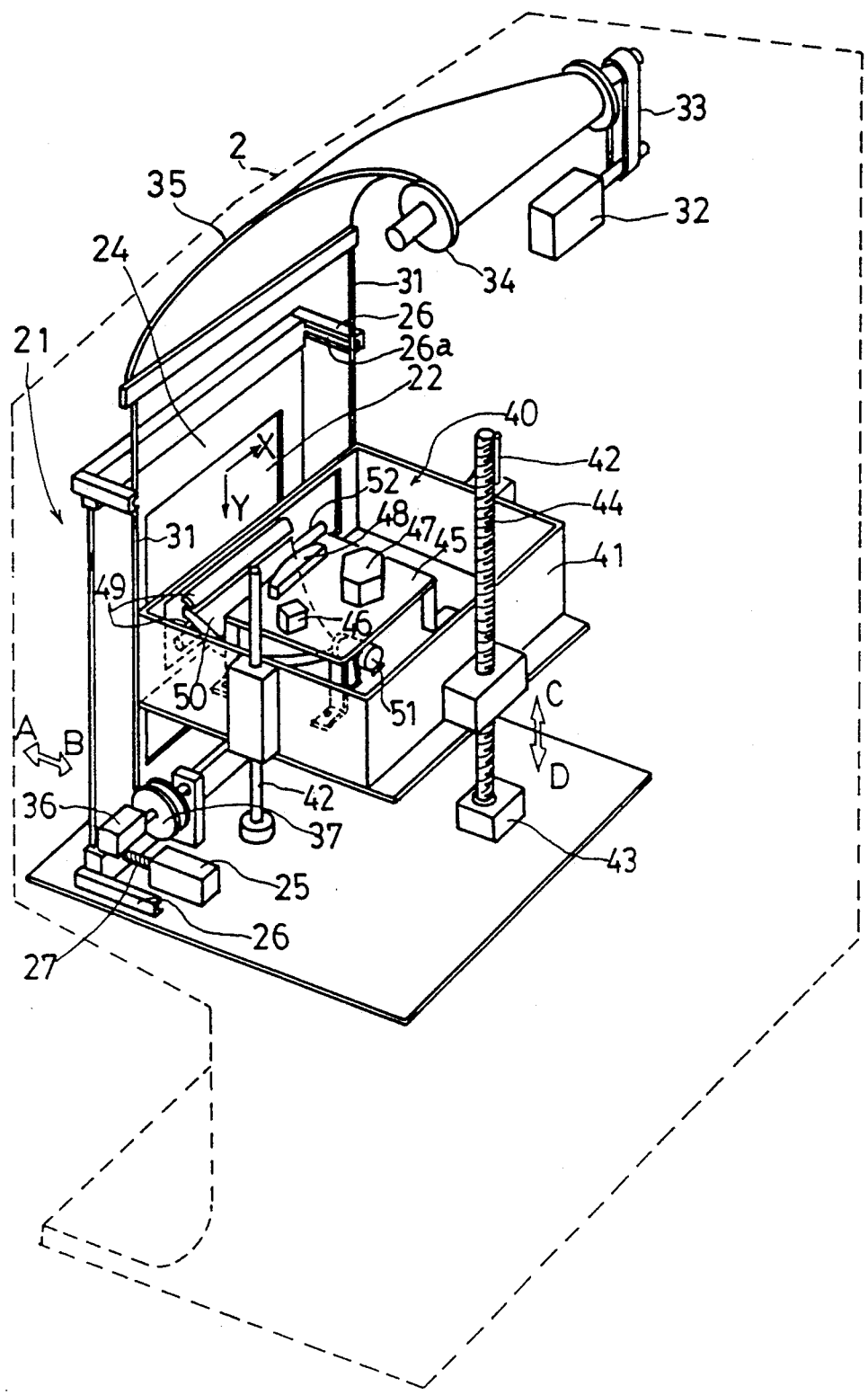
FIG. 2 is a schematic perspective view of the internal structure of an X-ray image converting apparatus showing a first preferred embodiment of the present invention.

Referring to FIG. 2, there is shown a general construction of the internal structure of an X-ray image converting apparatus according to a first preferred embodiment of the present invention.

A fixing plate 24, to which an accelerated phosphorescence fluorescent plate 22 is fixed, is provided in the photographing and recording section 21 of the X-ray image converting apparatus 2. The fixing plate 24 is driven by a motor 25 so that it is moved, under the guidance of a slide 26, in the direction indicated by an arrow mark A in FIG. 2, when photographing is to be performed but in the opposite direction indicated by another arrow mark B in FIG. 2 to a position adjacent to a pair of wires 31 when reading is to be performed.

Figure 3:
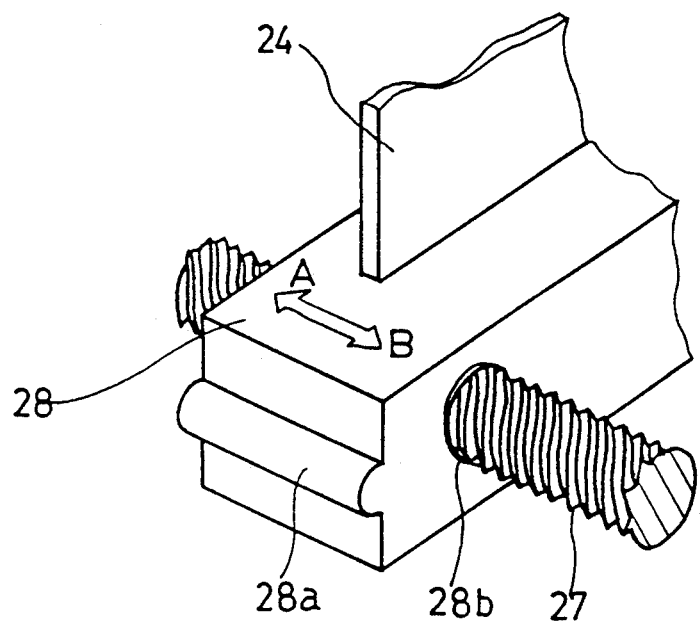
FIG. 3 is an enlarged perspective view showing a moving mechanism for an accelerated phosphorescence fluorescent plate of the X-ray image converting apparatus of FIG. 2.

FIG. 3 shows details of a mechanism for moving the accelerated phosphorescence fluorescent plate 22. Referring also to FIG. 3, an external thread is formed on a shaft 27 of the motor 25, and the fixing plate 24 to which the accelerated phosphorescence fluorescent plate 22 is fixed, is fixed to a fixing base 28. The fixing base 28 has a projection or rib 28a formed thereon for being received for sliding movement in an elongated groove 26a of the slide 26 and further has a hole 28b formed as a female thread therein with which the shaft 27 of the motor 25 is held in threaded engagement. Thus, when the motor 25 is rotated in one or the other direction, the fixing base 28 is moved in the direction indicated by the arrow mark A or B.

Referring back to FIG. 2, a lead containing sheet 35 is provided in the X-ray image converting apparatus 2 such that it is moved between a first position, in which it is wound up on a roller 34 which is driven by a motor 32 by way of a belt 33, and a second position in which the lead containing sheet 35 is stretched along the rear face side of the accelerated phosphorescent fluorescent plate 22. The lead containing sheet 35 is a flexible sheet which sufficiently contains therein lead which absorbs X-rays, and an upper end face of the lead containing sheet 35 is connected to a wire (not shown) attached to the roller 34 while a lower end face of the lead containing sheet 35 is connected to first ends of the wires 31. The other ends of the wires 31 are attached to a pair of wire winding rollers 37 (only one is shown in FIG. 2) which are driven by another motor 36.

The reading unit 40 is provided just behind the wires 31. The reading unit 40 includes a housing 41 in which a pair of holes having a pair of slide bars 42 are fitted and a female threaded hole which is held in threaded engagement with a shaft 44 connected to a shaft of a motor 43 and having a male thread provided thereon are formed. Thus, when the motor 43 is rotated, the reading unit 40 is moved in an upward or downward direction, that is, in the direction indicated by an arrow mark C or D.

A scanning optical system for repetitively scanning a laser beam on the accelerated phosphorescence fluorescent plate 22 in the direction indicated by an arrow mark X in FIG. 2 and a light receiving optical system for receiving accelerated phosphorescence light emitted from the accelerated phosphorescence fluorescent plate 22 upon scanning of a laser beam and converting the received accelerated phosphorescence light into an electric signal are provided in the reading unit 40. The scanning optical system is constituted from a laser light source 46, a rotary polygonal mirror 47, an fθ lens 48 and so forth, all placed on a receiving table 45 while the light receiving optical system is constituted from a reflecting mirror 49, a light converging member 50 formed from a large number of optical fibers, a photomultiplier 51 and so forth. The reading unit 40 further includes therein an erasing lamp 52 for causing X-ray energy remaining in the accelerated phosphorescence fluorescent plate 22, after completion of reading, to be discharged to put the accelerated phosphorescence fluorescent plate 22 into a re-usable condition.

In operation, the accelerated phosphorescence fluorescent plate 22 is moved in the direction of the arrow mark A by rotation of the motor 25, and the lead containing sheet 35 is moved into the position wherein it is disposed along the rear face side of the accelerated phosphorescence fluorescent plate 22 by rotation of the motor 25. The reading unit 40 then is in a condition wherein it is positioned at its limit position in the direction of the arrow mark C by rotation of the motor 43, so that an uppermost portion of the accelerated phosphorescence fluorescent plate 22 may be scanned by the reading unit 40. In this condition, X-ray photographing is performed in such a manner as seen from FIG. 1.

After completion of the X-ray photographing, the motor 25 is rotated so that the accelerated phosphorescence fluorescent plate 22 is moved in the direction of the arrow mark B, and the motor 32 is rotated so that the lead containing sheet 35 is moved away from the position behind the accelerated phosphorescence fluorescent plate 22 and wound up onto the roller 34. After then, reading is performed in the following manner.

In particular, a laser beam (not shown) emitted from the laser light source 46, is reflected and diverted by the rotary polygonal mirror 47 and then irradiated, after passing through the fθ lens 48, upon the accelerated phosphorescence fluorescent plate 22. Consequently, the accelerated phosphorescence fluorescent plate 22 is horizontally scanned repetitively in the X direction by the laser beam. During such repetitive horizontal scanning, the motor 43 is driven to move the reading unit 40 downwardly in the direction indicated by an arrow mark D in FIG. 2, whereupon the accelerated phosphorescence fluorescent plate 22 is vertically scanned in the direction indicated by an arrow mark Y.

From each scanning point on the accelerated phosphorescence fluorescent plate 22, accelerated phosphorescence light of an amount corresponding to an amount of X-ray energy accumulated and recorded at the point is emitted, and the accelerated phosphorescence light is introduced directly or after reflection by the reflecting mirror 49 into the light converging member 50. Consequently, the accelerated phosphorescence light is thereafter guided by the light converging member 50 so that it is introduced into the photomultiplier 51, in which it is photoelectrically converted into an analog image signal. The analog image signal is logarithmically amplified by a logarithmic amplifier (not shown) and then converted into a digital image signal by an A/D (analog to digital) converter (not shown either), whereafter it is transmitted to the image processing apparatus 5 (refer to FIG. 1).

After the accelerated phosphorescence fluorescent plate 22 is scanned to its lowermost portion in this manner thereby to complete reading of the X-ray image, the erasing lamp 52 is lit and the motor 43 is reversed so that the reading unit 40 is moved to its uppermost position in the direction indicated by an arrow mark C in FIG. 2. Consequently, X-ray energy which may otherwise remain in the accelerated phosphorescence fluorescent plate 22 is discharged, so that the accelerated phosphorescence fluorescent plate 22 is put into a re-usable condition.

Such a sequence of operations as described above will be repeated to perform the photographing and reading functions again.

Here, since X-ray photographing is performed while the lead containing sheet 35 is disposed along the rear face of the accelerated phosphorescence fluorescent plate 22, X-rays having passed through the accelerated phosphorescence fluorescent plate 22 are absorbed by the lead containing sheet 35. Consequently, such X-rays are prevented from being scattered by the reading unit 40 and so forth and introduced into the accelerated phosphorescence fluorescent plate 22 again. Accordingly, an X-ray image of a high degree of sharpness little influenced by backscattered radiations, is accumulated and recorded on the accelerated phosphorescence fluorescent plate 22.

Further, since the lead containing sheet 35 is wound up onto the roller 34 when reading is to be performed, it will not disturb the reading operation, and the reading operation can be performed only by linearly moving the accelerated phosphorescence fluorescent plate 22 in the direction indicated by the arrow mark B in FIG. 2. Due to the construction wherein the lead containing sheet 35 is moved between the first position behind the accelerated phosphorescence fluorescent plate 22 and the second position retracted from behind the accelerated phosphorescence fluorescent plate 22 (the position on or adjacent the roller 34 in the arrangement shown in FIG. 2), the mechanism for moving the accelerated phosphorescence fluorescent plate 22 can be simplified and the overall size of the apparatus can be reduced in comparison with an alternative arrangement wherein, for example, a rigid lead plate is disposed on the rear face of the accelerated phosphorescence fluorescent plate 22 and, when reading is to be performed, either the lead plate or the accelerated phosphorescence fluorescent plate 22 is moved away from its position.

It is to be noted that, while, in the embodiment described above, the lead containing sheet 35 is wound up onto the roller 34, it need not be wound up in this manner, but may be retracted along an upper wall, a rear wall or the like of the inside of the housing of the apparatus while it remains in a retracted condition.

Figure 4:
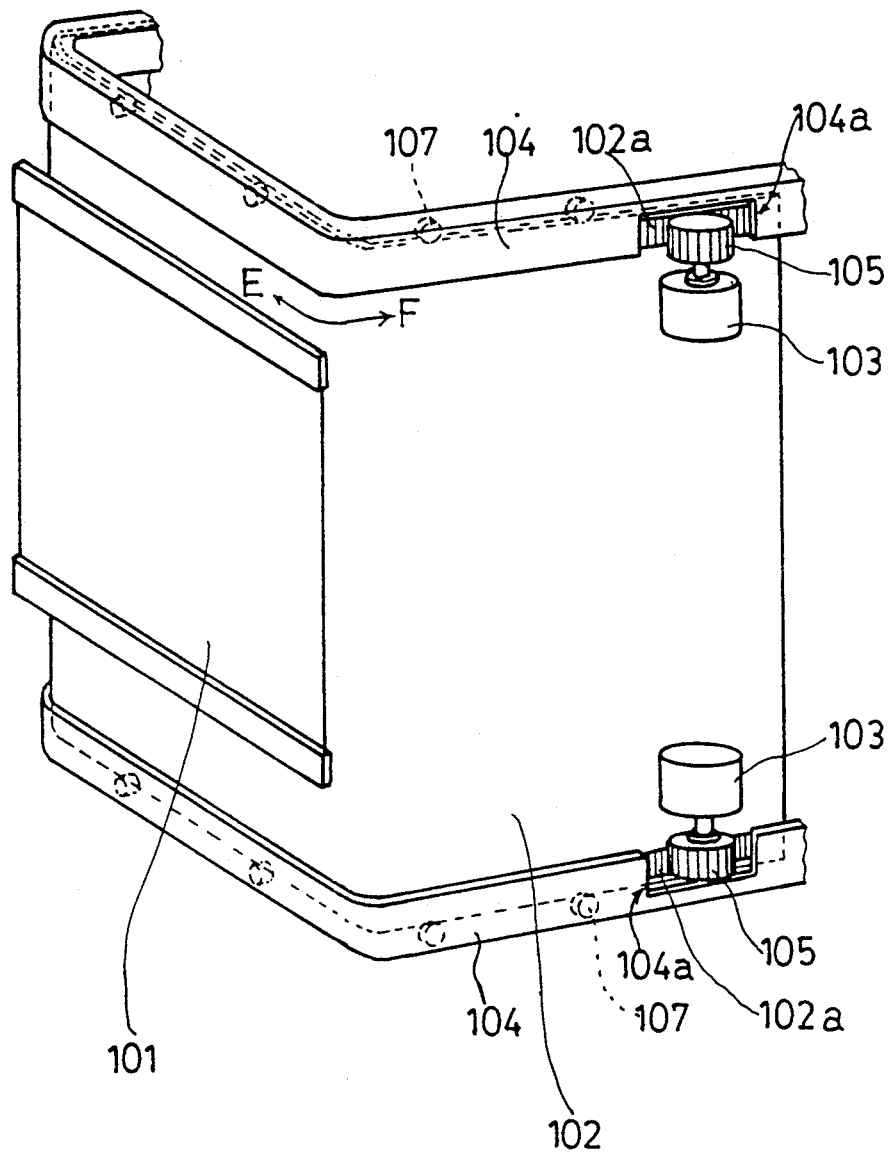
FIG. 4 is a perspective view, partly broken, of part of another X-ray image converting apparatus showing a second preferred embodiment of the present invention.

Referring now to FIG. 4, a part of another X-ray image converting apparatus according to a second preferred embodiment of the present invention is shown. The X-ray image converting apparatus shown includes a lead containing sheet 102 provided along a rear face of an accelerated phosphorescence fluorescent plate 101. The lead containing 102 is moved in the direction indicated by an arrow mark E or F under the guidance of a pair of guide rails 104 by rotation of a pair of motors 103.

Figure 5:
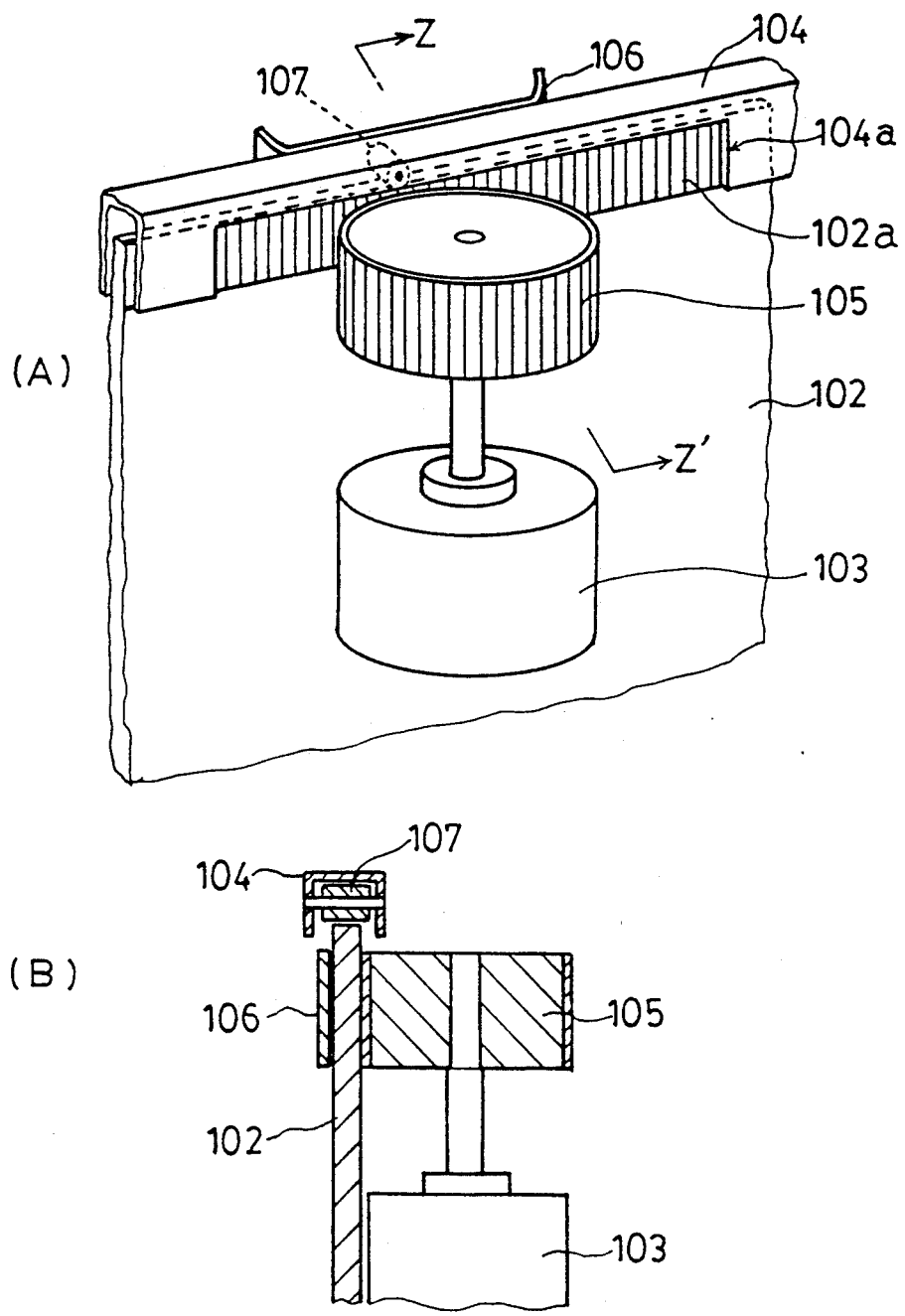
FIGS. 5(A) and 5(B) are an enlarged perspective view and a sectional view, respectively, of a sheet moving mechanism of the X-ray image converting apparatus shown in FIG. 4.

A moving mechanism for the lead containing sheet 102 is shown in more detail in an enlarged perspective view of FIG. 5(A) and also in FIG. 5(B) which is a sectional view taken along line Z—Z' of FIG. 5(A). Referring also to FIGS. 5(A) and 5(B), a feeding portion 102a for which antislipping working has been performed is provided on each of an upper edge portion and a lower edge portion of the lead containing sheet 102. Meanwhile, a roller 105 for which antislipping working has been performed is mounted on each of the motors 103 and is held in contact with a corresponding one of the feeding portions 102a of the lead containing sheet 102 at a window portion 104a at which the corresponding guide rail 104 is cut away. A contacting guide plate 106 is provided on the rear side of each of the guide rails 104 remote from the corresponding roller 105 across the feeding portion 102a, so that the feeding portion 102a of the lead containing sheet 102 is held between the roller 105 and the contacting guide plate 106. Further, a free rotation roller 107 is provided in each of the guide rails 104 such that it contacts with an end face of the lead containing sheet 102, as seen from FIG. 5(B), so that the frictional resistance of the lead containing sheet 102 upon movement is reduced.

Thus, the lead containing sheet 102 is driven by the motors 103 to move, prior to photographing, to a position behind the rear face of the accelerated phosphorescence fluorescent plate 101 under the guidance of the guide rails 104, and to move, prior to reading, to another position retracted from the position behind the rear face of the accelerated phosphorescence fluorescent plate 101.

Figure 6A:
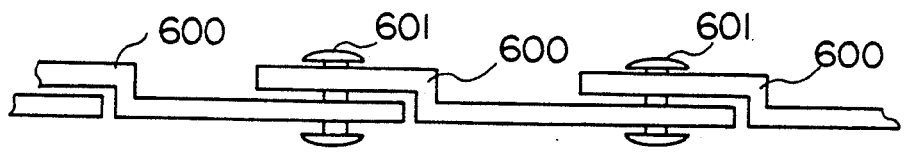
FIGS. 6(A) and 6(B) are a side elevational view and a perspective view, respectively, of part of a further X-ray image converting apparatus showing a third preferred embodiment of the present invention.
Figure 6B:
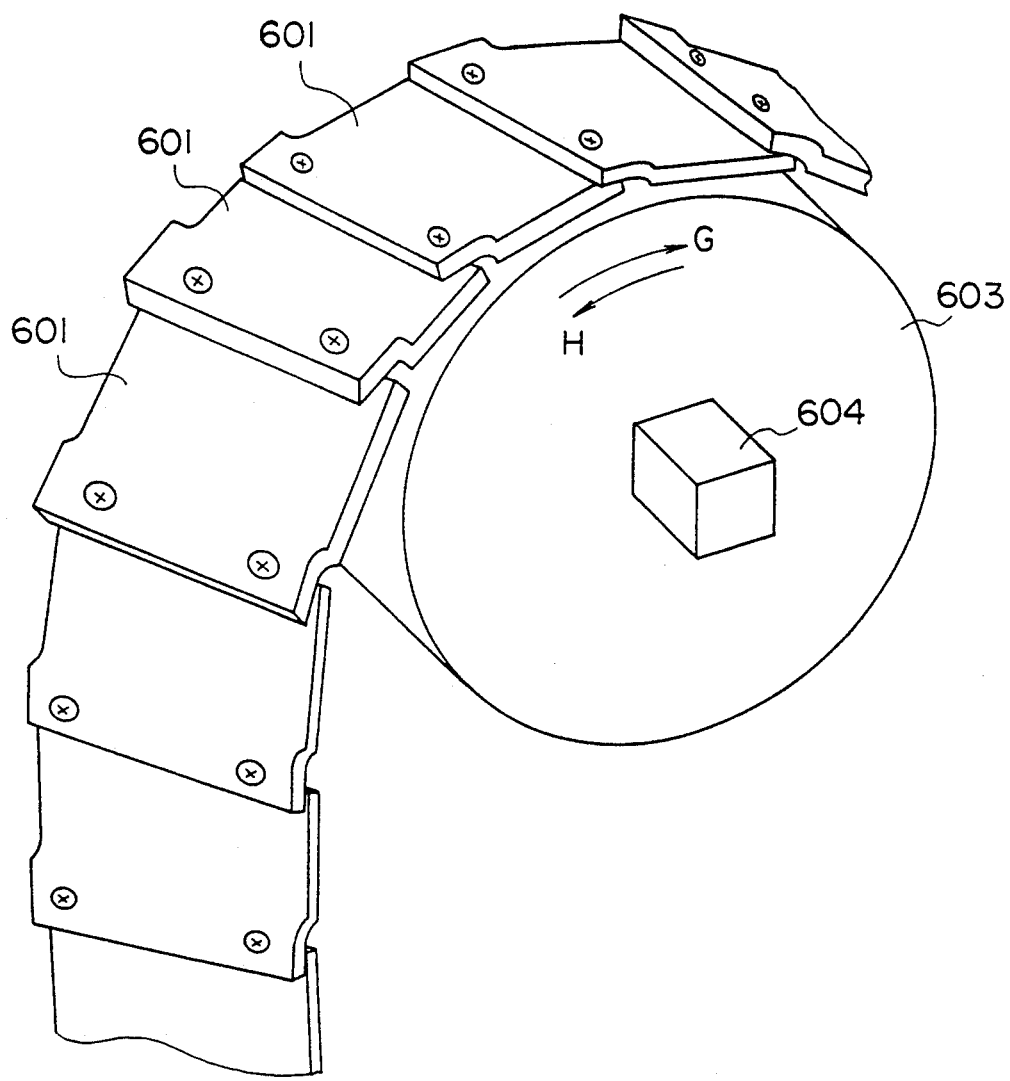

FIGS. 6(A) and 6(B) show a radiation absorbing plate of a further radiation image converting apparatus according to a third preferred embodiment of the present invention. Referring to FIGS. 6(A) and 6(B), the radiation absorbing plate shown is composed of a plurality of lead containing plates 600 connected to each other by means of connecting screws 601 such that adjacent ones thereof are partially overlapped with each other as seen in FIG. 6(A), so that the lead containing plates 600 may have a flexibility as a whole.

An end of the radiation absorbing plate which is composed of the plurality of lead containing plates 600 connected to each other in this manner is connected to a roller 603 as shown in FIG. 6(B). When a motor 604 is energized to rotate the roller 603 in the direction indicated by an arrow mark G in FIG. 6(B), the lead containing plates 600 are wound up by the roller 603 so that they are retracted from the position behind an accelerated phosphorescence fluorescent plate (not shown). On the contrary, when the motor 604 is energized reversely to rotate the roller 603 in the reverse direction indicated by an arrow mark H in FIG. 6(B), the lead containing plates 600 are disposed behind the rear face of the accelerated phosphorescence fluorescent plate.

Figure 7A:
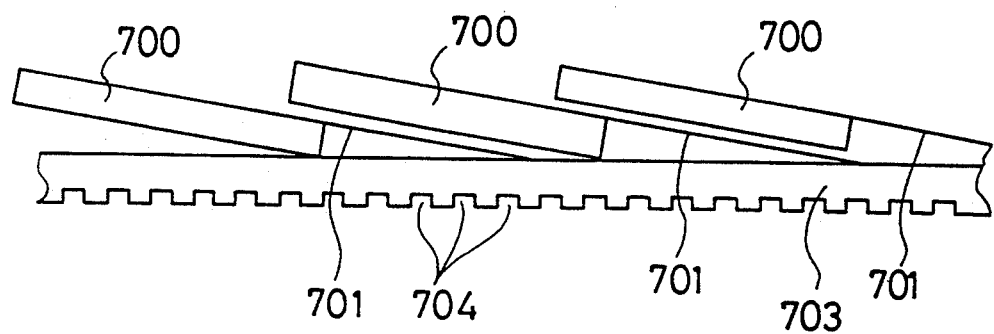
FIGS. 7(A) and 7(B) are a side elevational view and a perspective view, respectively, of part of a still further X-ray image converting apparatus showing a fourth preferred embodiment of the present invention.
Figure 7B:
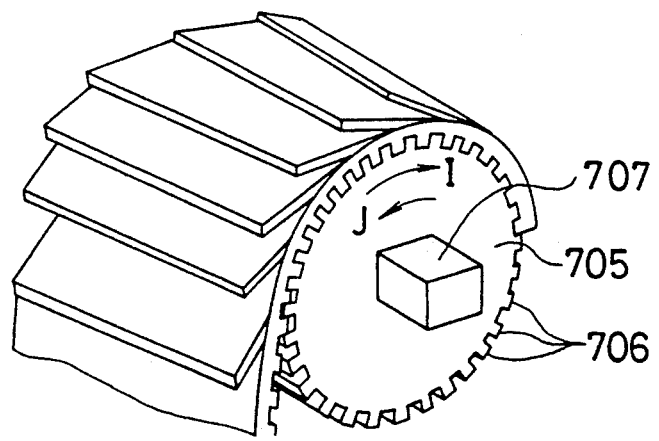

FIGS. 7(A) and 7(B) show a radiation absorbing plate of a still further radiation image converting apparatus according to a fourth preferred embodiment of the present invention. Referring to FIGS. 7(A) and 7(B), the radiation absorbing plate shown is composed of a plurality of lead containing plates 700 attached to a flexible belt 703 each by way of a connecting plate 701 such that adjacent ones of the lead connecting plates 700 are partially overlapped with each other as seen in FIG. 7(A). A plurality of lateral grooves 704 are formed at a predetermined pitch on a rear face of the belt 703.

The radiation absorbing plate constructed in such a manner as described just above extends between a pair of rollers 705 (only one is shown in FIG. 7(B)). Each of the rollers 705 has a plurality of lateral protrusions or ribs 706 formed on an outer periphery thereof for fitting with the lateral grooves 704 of the belt 703. When one of the rollers 705 is rotated in the direction indicated by an arrow mark I in FIG. 7(B) by a motor 707, the lead containing plates 700 are transported by the belt 703 to a position retracted from their position behind an accelerated phosphorescence fluorescent plate (not shown). On the contrary when the motor 707 is energized reversely to rotate the roller 705 in the reverse direction indicated by an arrow mark J in FIG. 7(B), the lead containing plates 700 are moved to the position behind the rear face of the accelerated phosphorescence fluorescent plate.

As seen from the radiation image converting apparatus of the third and fourth embodiments described above, such a lead containing sheet as is employed in the radiation image converting apparatus of the first and second embodiments may be replaced by a radiation absorbing plate which is composed of a plurality of rigid lead containing plates combined with each other such that they may have a flexibility as a whole. Further, such a plurality of lead containing plates combined with each other may either be wound up or be moved or shifted without being wound up.

While several examples of a lead containing radiation absorbing plate and a moving mechanism for the same are described above, a lead containing sheet or a radiation absorbing plate and a mechanism for the same are not limited to those described above but may naturally be constructed in various manners. Further, while the structures for moving an accelerated phosphorescence fluorescent plate in the forward and backward directions are described with reference to FIGS. 2 and 3, an alternative structure wherein an accelerated phosphorescence fluorescent plate is kept fixed may be employed, or even if an accelerated phosphorescence fluorescent plate is moved, the manner in which it is moved is not limited to that of FIGS. 2 and 3. Further, the radiation image converting apparatus shown in FIG. 2 has the structure wherein reading is performed from the rear face side of the accelerated phosphorescence fluorescent plate 22, and while the system wherein reading is performed from the rear face side of the accelerated phosphorescence fluorescent plate 22 is preferable from the point of view of achievement of simplification in structure of the equipment and miniaturization of the entire equipment, the present invention is not limited to the specific system, but an alternative system may be employed wherein, for example, an accelerated phosphorescence fluorescent plate is tilted down to the rear face side while a reading unit is in an upwardly retracted condition and a laser beam is emitted downwardly from the reading unit so that the front surface side of the accelerated phosphorescence fluorescent plate is scanned by the laser beam and then accelerated phosphorescence light emitted from the front surface side of the accelerated phosphorescence fluorescent plate is received. Further, in this instance, if a mirror is disposed at a position below the accelerated phosphorescence fluorescent plate in the tiled down condition so that also accelerated phosphorescence light emitted from the rear face side of the accelerated phosphorescence fluorescent plate upon scanning may be converged, photoelectric conversion can be achieved at a higher S/N ratio.

What is claimed is:

1. A radiation image converting apparatus, comprising:
    a photographing and recording unit having an accelerated phosphorescence fluorescent plate on which a radiation image is accumulated and recorded;
    a reading unit irradiating excitation light upon said accelerated phosphorescence fluorescent plate on which said radiation image is accumulated and recorded and receiving accelerated phosphorescence light emitted from said accelerated phosphorescence fluorescent plate, to produce an image signal carrying the radiation image;
    a flexible lead containing sheet for absorbing radiation which has passed through said accelerated phosphorescence fluorescent plate; and
    a sheet moving mechanism which is operative, prior to said radiation image being accumulated and recorded onto said accelerated phosphorescence fluorescent plate, to move said lead containing sheet to a first position interposed between said accelerated phosphorescence fluorescent plate and said reading unit, and which is operative, prior to reading the radiation image by said reading unit, to obtain said image signal and to move said lead containing sheet from said first position to a second position withdrawn from said first position.

2. A radiation image converting apparatus according to claim 1, wherein said sheet moving mechanism comprises a winding roller which winds said lead containing sheet thereon to retract said lead containing sheet from said first position to said second position.

3. A radiation image converting apparatus according to claim 1, wherein said lead containing sheet is disposed between said reading unit and said accelerated phosphorescence fluorescent plate when said lead containing sheet is in said first position, and said reading unit irradiates said excitation light upon a rear face side of said accelerated phosphorescence fluorescent plate and receives said accelerated phosphorescence light emitted from the rear face side of said accelerated phosphorescence fluorescent plate when said lead containing sheet is in said second position.

4. A radiation image converting apparatus, comprising:

a photographing and recording unit having an accelerated phosphorescence fluorescent plate on which a radiation image is accumulated and recorded;

a reading unit irradiating excitation light upon said accelerated phosphorescence fluorescent plate on which said radiation image is accumulated and recorded and receiving accelerated phosphorescence light emitted from said accelerated phosphorescence fluorescent plate, to obtain said image signal carrying the radiation image;

a radiation absorbing plate comprising a plurality of lead containing plates combined in such a manner as to have a flexibility at least in a predetermined direction and absorbing radiation passing through said accelerated phosphorescence fluorescent plate; and a moving mechanism which is operative, prior to said radiation image being accumulated and recorded onto said accelerated phosphorescence fluorescent plate, to move said radiation absorbing plate to a first position interposed between said accelerated phosphorescence fluorescent plate and said reading unit, and which is operative, prior to reading the radiation image by said reading unit to obtain said image signal, to move said radiation absorbing plate from said first position to a second position withdrawn from said first position.

5. A radiation image converting apparatus according to claim 4, wherein said moving mechanism comprises a winding roller which winds said radiation absorbing plate thereon to retract said radiation absorbing plate from said first position to said second position.

6. A radiation image converting apparatus according to claim 4, wherein said radiation absorbing plate is disposed between said reading unit and said accelerated phosphorescence fluorescent plate when said radiation absorbing plate is in said first position, and said reading unit irradiates said excitation light upon a rear face side of said accelerated phosphorescence fluorescent plate and receives said accelerated phosphorescence light emitted from the rear face side of said accelerated phosphorescence fluorescent plate when said lead containing sheet is in said second position.

* * * * *